April 9, 1946. J. B. WEBB ET AL 2,398,062
BRACKET FOR OVERHEAD TROLLEY CHAIN CONVEYERS
Filed April 12, 1943
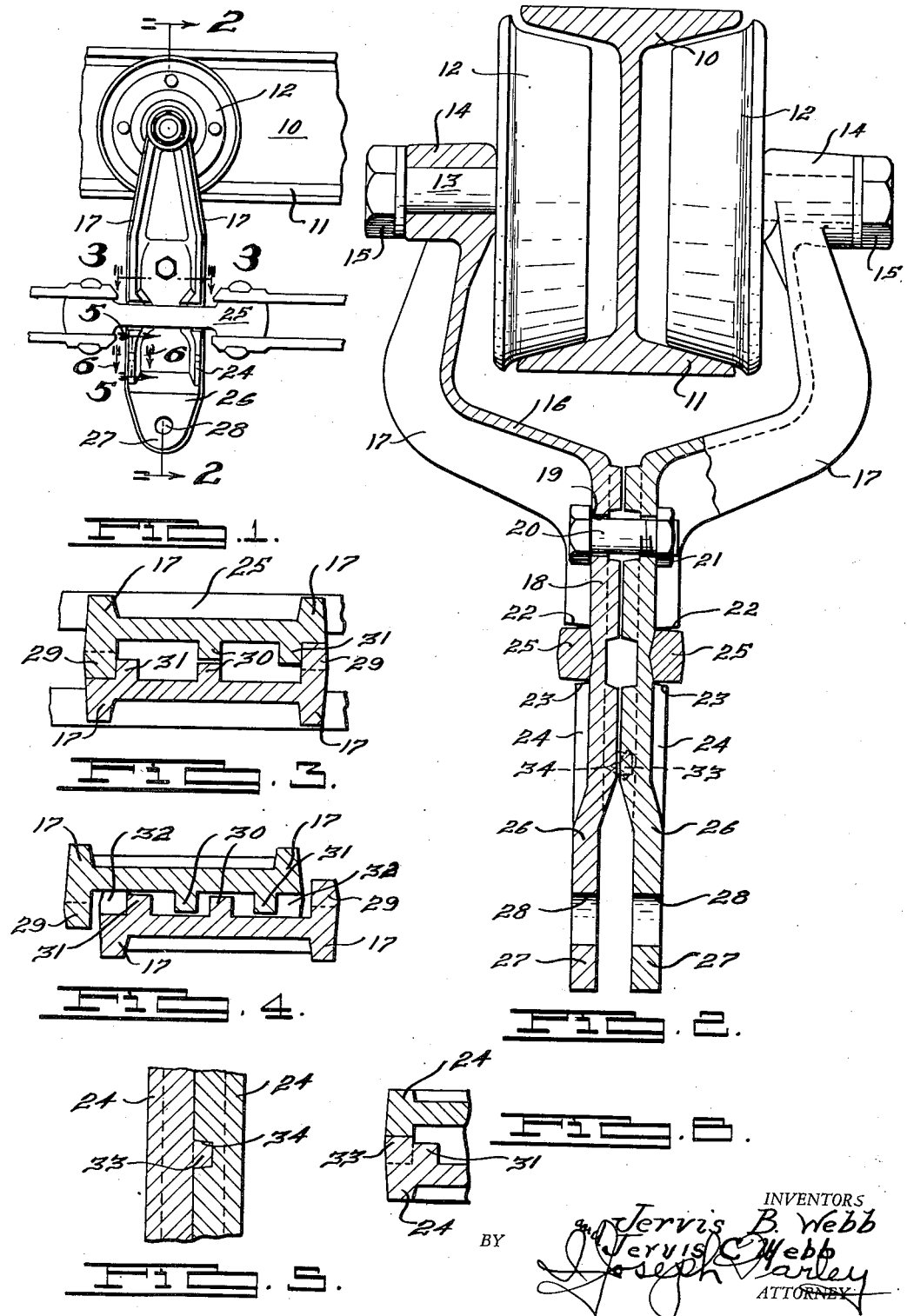

Patented Apr. 9, 1946

2,398,062

UNITED STATES PATENT OFFICE 2,398,062

BRACKET FOR OVERHEAD TROLLEY CHAIN CONVEYERS

Jervis B. Webb and Jervis C. Webb, Bloomfield Hills, Mich., assignors to Jervis B. Webb Company, Detroit, Mich., a corporation of Michigan Application April 12, 1943, Serial No. 482,714

9 Claims. (Cl. 198—177)

This invention relates to bracket constructions employed in connection with overhead trolley chain conveyers and has for its principal object to provide a new and improved construction for trolley brackets of the same general type as disclosed in my prior United States Letters Patent No. 1,541,539.

Trolley brackets of the type disclosed in the aforesaid patent have been very extensively used for many years and they consist essentially of a pair of generally angular shaped brackets, the upper ends of which are spaced apart and each of which upper ends carries a trolley wheel for engagement with the lower horizontally extending flange of a structural steel member such as a conventional I-beam. Such brackets converge towards each other at their lower ends where, as shown in the said prior patent, they are clamped together in associated or assembled relationship by a pair of conventional bolts and nuts, a spacing bar being interposed between the flat lower faces of the brackets, which spacing bar ordinarily has associated with it a clevis or other similar device for supporting rods to be carried. This spacing bar passes through the link of a conveyer chain of the type generally known as a Keystone Chain, such as disclosed in the patent to Weston, No. 870,704, granted November 12, 1907.

The clevis has an enlarged shoulder which serves to support the conveyer chain by engagement with the lower face of the chain link through which the clevis passes while the lower ends of the angular brackets form abutments terminating immediately above the upper face of the said chain link so as to hold the conveyer chain in properly spaced relationship to the supporting structural steel member, all as more fully shown in the said Webb Patent No. 1,541,539.

As disclosed in said patent, loads carried by the conveyer are supported by the bracket members and the weight of such loads is transmitted directly through the bracket members and associated parts to the structural steel support, no part of the weight of the loads being thrown upon the chain links which are employed for transmitting movement to the trolley brackets to cause them to traverse along the supporting structure and also to hold the brackets in properly spaced relationship with respect to each other.

One of the principal objects of the present invention is to provide a new and improved construction of a bracket member for an overhead trolley chain conveyer of the type disclosed in my aforesaid patent whereby the use of an additional spacing bar and clevis member between the converging lower ends of the pair of angular brackets may be dispensed with. With the brackets as heretofore commonly used in constructions of this character and as disclosed in my aforesaid patent, it has always been considered necessary to employ two clamping bolts for holding the brackets and clevis bar or load supporting member in properly assembled relationship and to maintain the brackets and trolley wheels in accurate alignment transversely of the supporting structural steel member and conveyer chain, the holding of the bracket members in proper transverse alignment being essential to prevent cramping or jarring of the trolley wheels in traversing the horizontal curves with which such overhead trolley chain conveyer lines are commonly provided.

With the above characteristics of the prior constructions in mind, it may now be stated that another important object of the present invention is to provide a new and improved construction of a trolley bracket member whereby the use of one of the pair of clamping bolts heretofore commonly employed may also be eliminated.

A further object is to incorporate in the bracket construction integral projecting flanges adapted, when the bracket members are properly assembled and clamped together by a single clamping bolt, to engage against each other in such a way as to prevent relative rotation between the pair of bracket members and to hold said brackets and the trolley wheels thereof in accurate transverse alignment.

Another object is to so construct the projecting flanges with which the brackets are provided, and which serve to perform the function of the additional spacing bar or plate heretofore employed, that the bracket members may be shifted relatively to each other to bring such spacing flanges out of alignment and permit the brackets to be inserted through a chain link after which the brackets may be moved relatively to each other to bring the projecting flanges and the bolt holes with which the brackets are provided in proper alignment so that when the clamping bolt has been placed in position and tightened the brackets are held securely in properly assembled relationship to the conveyer chain.

A further object is to incorporate in the bracket members integral extensions thereof which when a pair of brackets are assembled, perform the function of the extra or additional clevis member heretofore commonly employed.

Another object is to incorporate in the bracket members inter-engaging lugs and recesses which when the bracket members are assembled serve to relieve the single clamping bolt employed from shearing strains that might otherwise be transmitted to the bolt as a result of the loads carried by the clevis member.

A further object is to so construct the various flanges, spacing lugs and cooperating recesses with which the bracket members are provided, so that each bracket is identical in construction and although the brackets are assembled in pairs in opposed relationship, it is not necessary to construct the brackets as right and left hand members, the construction of each pair of bracket members being identical thereby enabling a standardized bracket construction to be employed with consequent savings in production costs, and as a corollary, facilitating assembling operations by avoiding the necessity of the erector having to select right and left hand brackets to complement each other to make a cooperating pair.

The above and other objects of the present invention will appear more fully from the following more detailed description and by reference to the accompanying drawing forming a part hereof wherein, Fig. 1 is a side elevation of a combined supporting structure trolley bracket and chain including a bracket constructed in accordance with the principles of the present invention;

Fig. 2 is an enlarged vertical section taken substantially on the line 2—2 of Fig. 1 showing a pair of brackets of the present invention in assembled condition;

Fig. 3 is a detailed section on the line 3—3 of Fig. 1, showing the parts in their normal operative position;

Fig. 4 is a view similar to Fig. 3 showing the brackets shifted transversely to each other to permit their insertion into, a chain link; and Figs. 5 and 6 are details on the lines 5—5 and 6—6, respectively, of Fig. 1.

As shown in the drawing the overhead trolley chain conveyers are usually supported upon a structural steel member 10 which in the form selected for illustration is shown as an I-beam. The lower horizontally extending flange 11 of the I-beam is employed as a supporting track for a pair of opposed trolley wheels 12. As each of the trolley wheels and the bracket members in which they are carried are of identical construction, a description of one will suffice for both.

Each trolley wheel is rotatably supported upon a bolt 13 which passes through a suitable bearing boss 14 provided at the upper end of each bracket member, the bolt 13 being held in fixed position within the bearing 14 by means of a nut 15. Each bracket has an angularly shaped portion 16 which extends inwardly to a point approximately in line with the vertical web of the I-beam 10. In order to impart greater rigidity to the brackets they are provided along their side edges with outwardly projecting marginal flanges 17. The angular part 16 of each bracket merges with a vertically extending web portion 18 located between the marginal flanges 17, and the web portion 18 of each bracket member towards the upper end thereof is provided with a hole 19 adapted to receive the shank of a connecting and clamping bolt 20 having a nut 21 by means of which the brackets may be clamped together in asembled relationship. A short distance below the holes 19 each of the side marginal flanges 17 terminates in a shoulder 22 which shoulders 22 serve as abutments or locating stops between which, and similar shoulders 23 formed by the upper end of somewhat similar, though lower side flanges 24, is adapted to be received the side bars of a chain link 25.

Adjacent to their lower ends the web portions 18 of the brackets are flared outwardly as indicated at 26 to provide, when the brackets are clamped together in assembled relationship, a pair of clevis jaws 27 each of which is provided with a hole 28 for the reception of a pin, bolt, or other supporting means upon which a load carrying member (not shown) of any suitable construction may be supported. Each bracket member is provided on its inner face with a plurality of ribs 29, 30 and 31, shown most clearly in Fig. 3 of the drawing. Each of the ribs 29 and 31 preferably extend substantially the full length of the flat vertically extending web portion 18 of each bracket and project outwardly from the inner faces thereof, said ribs 29 and 31 being of unequal height for purposes which will presently appear, while the rib 30 with which each bracket is provided, projects outwardly from the inner face of the bracket along the central portion of the flat web 18. The rib 29 which projects along one marginal side edge of the bracket, is substantially twice the height of the rib 30, while the rib 31 which extends along and adjacent to the other side edge of the bracket is spaced inwardly from such side a distance substantially equal to the thickness of the web 29; the height of the rib 31 being substantially equal to the height of the rib 30.

When the brackets are placed together in operative assembled position shown in full line in the drawing the outer portion of the rib 29 of each bracket seats within the right angled recess indicated by the reference character 32 formed between the side wall of the rib 31 of the companion bracket and the outer face of the web portion 18 thereof, as indicated in Fig. 3 of the drawing. When the two bracket members are in the full line operative position shown in Fig. 3, the two marginal ribs or flanges 29 provide in effect spacing bars which hold the web portions 18 of the pair of bracket members in properly spaced relationship and in contact with the inner face of the side walls of the chain link 25, as shown in Fig. 2 of the drawing, the shoulders 22 and 23 provided respectively at the lower ends of the side flanges 17 and 24 serving as abutment stops or locating means for the chain link. The ribs 30 located centrally of each web portion 18 of each bracket are one-half the height of the ribs 29, and the two ribs 29, one located one at each side of the pair of assembled brackets cooperate with the central ribs 30 to hold the brackets in the above described desired spaced relationship with the central ribs 30 cooperating with the ribs 29 to effect the desired spatial relationship and at the same time prevent bowing or bending of the central part of the web portions 18 when the clamping bolt 20 has been securely tightened.

In order to relieve the clamping bolt 20 from shearing strains resulting from loads carried by the clevis portions 27 of the brackets, each bracket member has formed on it adjacent to the lower end of each rib 31 a small projecting lug 33 located between the outer side wall of the rib 31 and the outer side edge of the bracket and each flange 29 at a corresponding point is provided with a small recess 34 into which the small lug 33 is adapted to fit. (See Figs. 5 and 6.)

The manner in which the brackets are assembled is as follows:

One of the bracket members is inserted into the open space provided between the inner side edges of the link 25 until one of the side bars of the link is received between the recesses formed between the two shoulders 22, 23 formed at the lower and upper edges respectively of the side flanges 17 and 24. The cooperating bracket member is then placed with the ribs 30 out of alignment with each other and the ribs 29 out of alignment with the shouldered recesses 32 as indicated in Fig. 4 and the second bracket member is then slid longitudinally in the chain link 25 and until it is properly located with respect to the companion bracket member with the holes 19 of the two bracket members in substantially correct vertical alignment. The two bracket members are then moved away from each other and slid laterally to bring the parts in the position shown in Fig. 3 with the central ribs 30 in alignment with each other and with the edges of the ribs 29 seated within the right angled recesses 32. The bolt 20 is then passed through the cooperating aligned hole 19 and the two bracket members are tightened together in assembled position by tightening the nut 21. After the two bracket members have been so assembled it will be seen that the engagement of the outer portion of each flange 29 within the right angled recess 32 formed between the rib 31 of the opposite bracket and the edge of the bracket and the engagement of the two ribs 29, one on each bracket within the recess formed on the other bracket, effectually prevents any sideways twisting or relative rotational movement of the two brackets with respect to each other. The small lug 33 with which each bracket is provided is so located relatively to the hole 19 of each bracket that when the two holes 19 are brought into sufficiently close alignment to permit the passage of the bolt 20 therethrough, the lug 33 in each bracket slips sideways into the corresponding recess 34 provided in the flange 29 of the opposite bracket. The engagement of the lugs 33 within the recesses 34 serves not only to position the holes 19 in proper alignment, but also acts to prevent sufficient movement of the brackets longitudinally of each other as would produce any substantial shearing strains upon the bolt 20.

As will be seen from the foregoing description the provision of the cooperating ribs or flanges 29 seated within the recesses provided for their reception and formed between the ribs 31 and the inner face of the web portions 18 of the brackets along the side edges thereof very effectively prevents any twisting movement of the brackets relatively to each other while the provision of the ribs 29 and the engagement of the outer or top faces thereof with the inner faces of the webs 18 of each side of each bracket, together with the provision of the central ribs 30, all cooperate to hold the brackets in properly spaced relationship and thereby permits the entire elimination of the use of an additional spacing bar between the two bracket members such as heretofore commonly employed.

As will be seen from the foregoing, each bracket member is of the same standard construction so that right and left bracket members do not have to be employed thereby tending to reduce production costs. Likewise when assembling the two brackets the assembly operation is made easier because of the fact that the erector is not required to handle or manipulate the additional central spacing bar heretofore used. Assembling operations are also facilitated because of the fact that only one clamping bolt is required instead of the two bolts heretofore commonly employed.

It will be readily understood that many changes, variations and modifications may be made in the minor structural details of the embodiment of the invention selected for illustration without departing from the spirit of the invention as set forth in the following claims.

We claim:

1. A trolley for supporting a chain conveyer comprising a pair of oppositely disposed angular bracket members, each of said members having a trolley wheel carried by the upper end thereof and converging towards their lower ends, and each of said members having a plurality of longitudinally extending spaced ribs projecting from their inner faces and adapted, when said members are laterally shifted with respect to each other so that the ribs of the respective members are out of opposed abutting relationship with each other to permit the ribs to overlap or mesh thereby decreasing the combined thickness of the lower ends of said bracket members to an extent sufficient to permit their free passage through the elongated opening of a chain link, and further adapted, when said members are clamped together so that the ribs of the respective members are in opposed abutting relationship with each other to hold the lower ends of said members in spaced transverse relationship for engagement with the side bars of said chain link.

2. A trolley bracket of the type wherein a pair of opposed bracket members are bolted together with the upper ends thereof forming an open Y-shaped yoke, a pair of laterally spaced trolley wheels carried one in the upper end of each member, a structural supporting member providing a track along which said trolley wheels are adapted to run, said bracket members converging towards their lower ends and means for permitting passage of said lower ends through the elongated opening of a chain link and for holding said lower ends in laterally spaced relationship for engagement with the side bars of said chain link comprising a plurality of longitudinally extending ribs projecting from the inner face of said bracket members spaced to permit overlapping during assembly with said chain link and opposed abutting relationship after such assembly and a single clamping bolt for clamping said bracket members together with certain of the ribs of one of said members in clamped engagement with certain of the ribs of the other of said members.

3. A bracket for an overhead trolley chain conveyer, said conveyer being of the type wherein a supporting structural member is provided and said bracket consists of a pair of similar angular bracket members, each flaring outwardly at its upper end and having a trolley wheel secured on the inner side of said upper end for engagement with said supporting member, the lower part of each bracket member having a centrally connecting web portion, a rib projecting from the inner face of said web portion and extending along the longitudinal center portion thereof, a second rib projecting inwardly from said inner face along one side edge of said web and a third rib located adjacent to the other side of said web but spaced inwardly from the edge thereof a distance approximately equal to the width of said second named rib.

4. An overhead trolley conveyer comprising a structural supporting member, a trolley bracket consisting of a pair of similar angular bracket members, each of said bracket members having an outwardly flaring upper portion adapted to form with the similarly outwardly flaring portion of the cooperating bracket member when said bracket members are clamped together in assembled position, an open ended yoke to straddle said structural member, a trolley wheel carried by the upper end of each of said bracket members for engagement with said structural supporting member, the lower ends of said bracket members being arranged in juxtaposed relationship, a conveyer chain having a plurality of links, each having a vertical elongated opening therein and a pair of side bars which bound such opening, a plurality of longitudinally extending spaced ribs projecting from the inner faces of the lower ends of the bracket members and the thickness of said lower ends and said ribs being such that when said members are arranged with their respective ribs out of alignment the lower ends of a pair of said members may be passed freely through the elongated opening of one of said links, and each of said bracket members having a pair of outwardly projecting flanges extending longitudinally of each bracket member along the side edge thereof, and said side flanges being cut away to provide a recess in which the side bars of said conveyer chain link are adapted to be seated when said members are assembled with the ribs thereof in aligned abutting engagement whereby said conveyer chain is supported by said bracket in predetermined spaced relationship to said structural supporting member.

5. An overhead trolley conveyer of the type which consists of a structural supporting member having a substantially horizontal flange at its lower end which forms a track, a pair of opposed trolley wheels rotatably carried on said track, a trolley bracket at the upper end of which said pair of trolley wheels are rotatably mounted, said bracket having a narrowed, elongated depending portion and a conveyer chain connected with and supported by said depending lower portion of said bracket in spaced relationship to said structural supporting member, characterized by said bracket consisting of a pair of similar angular bracket members, each having a pair of flanges projecting outwardly along the side edge thereof and terminating intermediate the depending portion of said bracket in a shoulder for engagement with the upper face of a link of said conveyer chain and each of said bracket members having a pair of similar outwardly projecting flanges extending longitudinally along the lower side edges of their depending portions and terminating in a shoulder for engagement with the lower face of the said conveyer chain link, and the lower ends of each of said bracket members having a plurality of longitudinally extending spaced ribs projecting from the inner faces thereof arranged in such manner as to permit overlapping of the ribs during assembly with said chain link and opposed abutting relationship after such assembly thereby holding said shoulders in engagement with said link.

6. An overhead trolley conveyer of the type which consists of a structural supporting member having a substantially horizontal flange at its lower end which forms a track, a pair of opposed trolley wheels rotatably carried on said track, a trolley bracket at the upper end of which said pair of trolley wheels are rotatably mounted, said bracket having a narrowed, elongated depending lower portion and a conveyer chain connected with and supported by said depending lower portion of said bracket in spaced relationship to said structural supporting member, certain of the links of said conveyer chain having an elongated vertical opening therein and side bars which define such opening, said bracket consisting of a pair of similar bracket members each of which in its lower depending portion has a central web section, a rib projecting inwardly from the inner face of said web portion and extending along the longitudinal center of the said web portion, a second rib also projecting inwardly and extending longitudinally of said web portion along one side edge thereof and a third rib extending inwardly from the inner face of said web portion adjacent to the other side edge thereof but spaced inwardly from said edge a distance substantially equal to the thickness of said second rib to provide a longitudinally extending shouldered recess, each of said bracket members also being provided with a pair of side flanges projecting outwardly from the outer face of said web portion and being provided with a shouldered recess for engagement with the side bars of said chain, said second rib being approximately twice the height of said central rib, and said ribs being spaced apart from each other a distance such that when said bracket members are moved transversely of each other the central rib of one bracket member will seat within the space between the central rib and third rib of the adjacent bracket member, thereby permitting the depending portions of said pair of bracket members to be inserted into the elongated opening of said chain link.

7. An overhead trolley conveyer of the type which consists of a structural supporting member having a substantially horizontal flange at its lower end which forms a track, a pair of opposed trolley wheels rotatably carried on said track, a trolley bracket at the upper end of which said pair of trolley wheels are rotatably mounted, said bracket having a narrowed, elongated depending lower portion and a conveyer chain connected with and supported by the said depending lower portion of said bracket in spaced relationship to said structural supporting member, certain of the links of said conveyer chain having an elongated vertical opening therein and side bars which define such opening, said bracket consisting of a pair of similar bracket members each of which in its lower depending portion has a central web portion, a rib projecting inwardly from the inner face of said web portion and extending along the longitudinal center of the said web portion, a second rib also projecting inwardly and extending longitudinally of said web portion along one side edge thereof and a third rib extending inwardly from the inner face of said web portion adjacent to the other side edge thereof but spaced inwardly from said edge a distance substantially equal to the thickness of said second rib to provide a longitudinally extending shouldered recess, each of said bracket members also being provided with a pair of side flanges projecting outwardly from the outer face of said web portion and being provided with a shouldered recess for engagement with the side bars of said chain, said second rib being approximately twice the height of said central rib and said ribs being spaced apart from each other a distance such that when said bracket members are moved transversely of each other the central rib of one bracket member will seat within the space between the central rib and third rib of an adjacent bracket member thereby permitting the depending portions of said pair of bracket members to be inserted into the elongated opening of said chain link, and after said bracket members have been inserted into said chain link the depending portions thereof may be moved transversely of each other to bring the central rib of each bracket member in alignment with the central rib of the other bracket member and with said second rib of each bracket member seated within said longitudinally extending shouldered recess of the other bracket member and a clamping bolt for holding said pair of bracket members in clamped engagement, the central ribs of each bracket member preventing distortion of the depending portions thereof when they are clamped together and the engagement of said second rib within said shouldered recess preventing twisting or relative rotational movement of said bracket members.

8. A trolley conveyer as set forth in claim 7 in which each of said bracket members is provided on the inner face thereof with a small projecting lug and said second rib is provided with a correspondingly shaped recess to interlock with said lug when said bracket members are aligned to lock said bracket members against longitudinal movement relative to each other.

9. A trolley bracket of the type wherein a pair of opposed bracket members are bolted together with the upper ends thereof forming an open Y-shaped yoke, a pair of laterally spaced trolley wheels carried one in the upper end of each bracket member, a structural supporting member providing a track along which said trolley wheels are adapted to run, said bracket members converging towards their lower ends and means for permitting passage of said lower ends through the elongated opening of a chain link and for holding the lower ends of said bracket members in laterally spaced relationship for engagement with the side bars of said chain link comprising a plurality of longitudinally extending spaced ribs projecting from the inner face of each of said bracket members spaced to permit overlapping during assembly with said chain link and opposed abutting relationship after such assembly, and a single clamping bolt for clamping said bracket members together with certain of the ribs of one of said bracket members in clamped engagement with certain of the ribs of the other of said bracket members, and each of said bracket members having an integral extension projecting below the ribbed portions thereof thereby to form the pair of jaws of a clevis yoke to which a load supporting member may be connected.

JERVIS B. WEBB.
JERVIS C. WEBB.